United States Patent Office 2,981,372
Patented Apr. 25, 1961

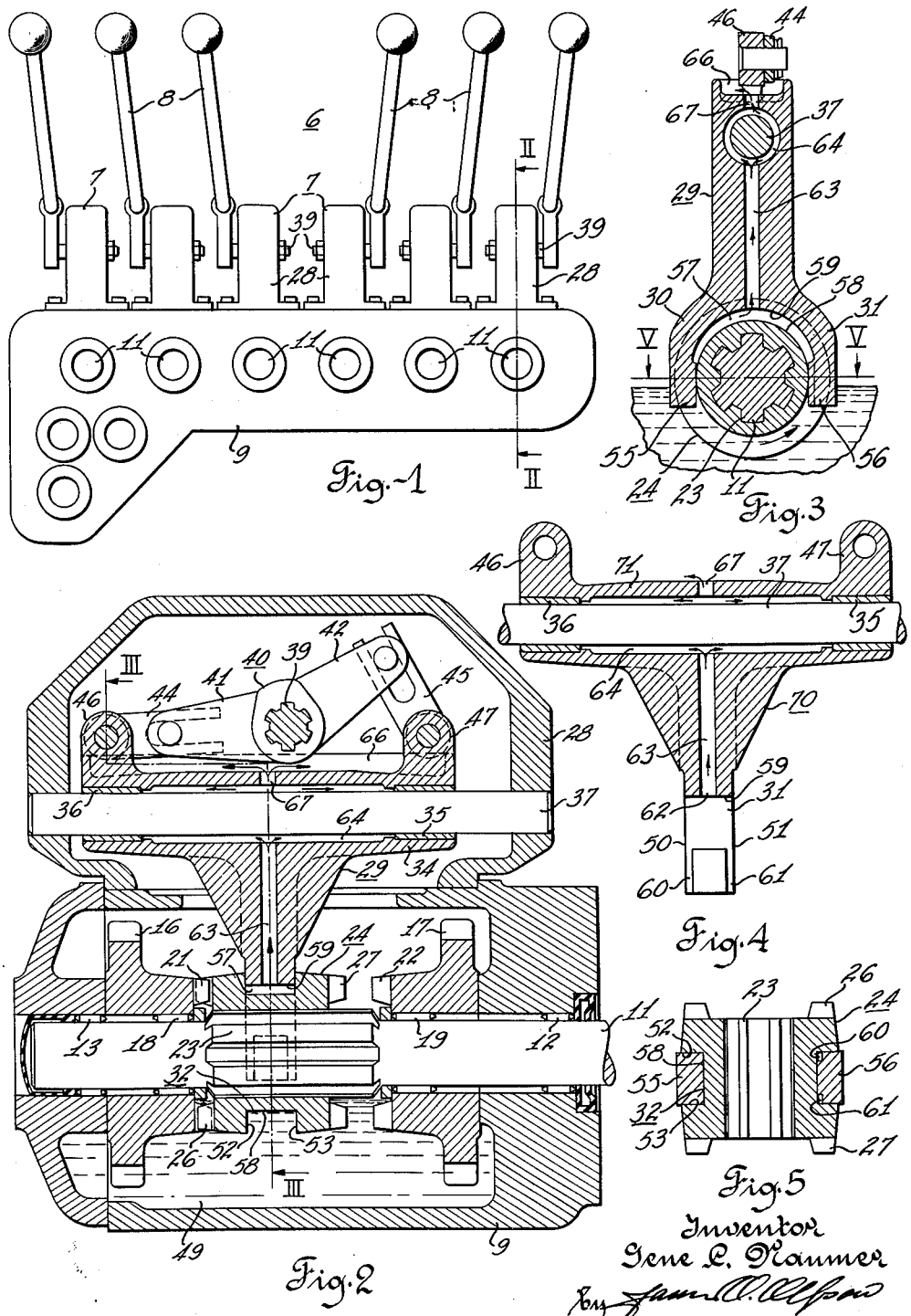

2,981,372

LUBRICATION SYSTEM FOR A SHIFTER ASSEMBLY

Gene C. Naumer, Eau Gallie, Fla., assignor to Allis-Chalmers Manufacturing Company, Milwaukee, Wis.

Filed June 9, 1959, Ser. No. 819,125

14 Claims. (Cl. 184—6)

This invention relates generally to shifter devices for power transmission mechanisms and the like and is more particularly concerned with a lubrication system to be incorporated into such devices.

It will be readily appreciated that in order to provide a power transmission mechanism which will function properly and will have a satisfactory wear life all moving parts therein must be properly and adequately lubricated. For example, the motor grade power control box shown in the patent to C. P. Leliter, U.S. 2,870,643, issued January 27, 1959, the various shifter fork devices and the control linkages therefor are located well above the oil level in the gear box. The only provisions made for lubricating the various shifter devices is by inserting the spout of an oil can through a hole in the top of each of the control stations of the assembly. Frequently operators neglect to lubricate this linkage and as a result the bearings of the shifter fork assembly have become corroded thus making it extremely difficult for the shifter linkages to operate smoothly, particularly when the vehicle has not been in operation for some time. Corrosion of the relatively movable parts tends to increase friction which will obviously reduce the normal wear life of the power control gear box assembly and make it extremely difficult to operate, thereby putting additional strain on the operating linkage.

Heretofore, various specially designed lubricating pumps have been suggested in order to automatically circulate oil under pressure throughout power transmission mechanisms. Such pump systems, however, are expensive to manufacture and install and are, therefore, unsatisfactory from the commercial standpoint.

Also splash type lubrication systems have been suggested. In addition to being less efficient than a pressure system these splash systems are not always readily adapted to established gear arrangements within a transmission mechanism. Therefore, from the engineering standpoint such systems may be unsatisfactory for some transmission applications.

In providing a lubrication system for the motor grader power control box assembly of the type referred to herein the designer must provide a simple construction so as not to substantially increase the overall cost of manufacturing the assembly and yet provide an efficient system which will automatically lubricate the specified parts.

It is, therefore, an object of the present invention to provide a lubricating system for power transmission devices which will overcome the disadvantages and meet the requirements hereinbefore outlined in an entirely satisfactory manner.

It is a further object of the present invention to provide a source of lubricating oil pressure by adapting a shifter fork and shifter collar to operate as a viscosity pump.

It is another object of the present invention to provide a pressurized lubrication system without utilizing a separate and distinct oil pump.

It is a further object of the present invention to provide a lubrication system for the shifter fork assembly of a transmission mechanism by utilizing the coaction of the shifter fork and shifter collar as an oil pump.

These and other objects and advantages will become apparent to those skilled in the art when the following detailed description is read in conjunction with the annexed drawings in which:

Fig. 1 shows the backside of a motor grader power control gear box as it would be viewed from the operator's station on the motor grader;

Fig. 2 is a section view through one of the control stations taken along line II—II in Fig. 2 and illustrates the shifter fork and shifter collar disposed in an engaged position;

Fig. 3 is a sectional view through the shifter collar and shifter fork taken along line III—III in Fig. 2;

Fig. 4 is a disconnected view of another embodiment of a shifter fork similar to the one illustrated in Fig. 2; and Fig. 5 is a sectional view through the shifter fork and shifter collar taken along line V—V in Fig. 3.

The power transmission mechanism indicated generally by reference numeral 6 is actually a power control gear box of the type which is used on a conventional motor grader vehicle for selectively transmitting driving power from the engine to the several mechanically adjustable mechanisms carried by the motor grader. Although such a motor grader is not shown in the drawings it is to be understood that power control gear box 6 is similar in kind to the one shown in U.S. Patent 2,870,643, issued to C. P. Leliter, January 27, 1959. As shown in Fig. 1, gear box 6 appears approximately as it would be viewed from the operator's station on the conventional motor grader.

Referring to Figs. 1 and 2, the gear box 6 includes a plurality of control stations 7 corresponding in number to the number of adjustable mechanisms carried by the vehicle. By means of the hand levers 8 at the several control stations 7 torque may be selectively transmitted from the power control box 6 to the corresponding adjustable mechanism of the motor grader.

The gear box housing 9 is of the conventional design and contains a plurality of driven shafts 11, only one of which is shown in Fig. 2, corresponding respectively to each control station and hence to each of the mechanically adjustable mechanisms of the motor grader. Each of the shafts 11 are journaled on suitable bearings 12 and 13 within housing 9 and have an end extending outwardly through one side of the housing (as shown in Fig. 2) where it will in actual practice be drivingly connected through suitable shafting (not shown) with one of the power adjusted mechanisms of the motor grader. Such a mechanism for example, may be the moldboard lift, wheel lean mechanism, circle turn mechanism, scarifier lift, moldboard side shift etc. none of which are shown.

Rotary motion may be imparted to shaft 11 by either one of a pair of spur gears 16 and 17 which are respectively rotatably mounted on shaft 11 by means of suitable bearings 18 and 19. Gears 16 and 17 are in constant mesh respectively with the corresponding spur gears (not shown) in adjacent control station 7 and are constantly being driven in opposite directions. The gearing and power train from the power take-off at the motor grader's engine to gears 16 and 17 is disclosed in complete detail in U.S. Patent 2,870,643 which has hereinbefore been referred to.

Each of the gears 16 and 17 is provided at one face with tapered jaws, as indicated at 21 and 22 respectively. By means of a splined connection at 23 a shifter collar 24 is slidably and nonrotatably carried on the driven shaft 11 intermediate gears 16 and 17. Collar 24 is provided at opposite faces with tapered jaws 26 and 27 for engagement respectively with the jaws 21 and 22 of gears 16 and 17. Jaws 21 and 26 in effect form one jaw clutch and jaws 22 and 27 are effective to form a second jaw clutch. For example, jaws 21 and 26 may be engaged thereby imparting rotation to the driven shaft 11 in one direction to lower the motor grader's moldboard into engagement with the ground and upon meshing jaws 22 and 27 causing rotation of shaft 11 in the opposite direction to raise the moldboard.

In order to effect shifting of the clutch collar 24 axially of shaft 11 to selectively engage jaws 21 and 26 or jaws 22 and 27, a shifter fork assembly 29 is provided which is mounted within support housing 28 of the control station 7. Housing 28 is rigidly connected on housing 9, both housings together being effective as a unitary support. Shifter fork assembly 29 includes a bifurcated end or yoke portion having a pair of tines or bifurcations 30 and 31. The bifurcated end including tines 30 and 31 is complementary to and received in an annular groove 32 formed in the shifter collar 24.

Shifter fork assembly 29 also is provided with a sleeve portion 34 which is slidably mounted by suitable sleeve bearings 35 and 36 on a support shaft 37 which in turn is anchored on housing 28 and is disposed in spaced parallel relation to shaft 11. Shaft 37 together with bearings 35 and 36 provides a means for mounting the shifter fork on housing 28. It will also be readily apparent that shaft 37 and bearings 35 and 36 present relatively movable bearing or friction surfaces which must be properly lubricated.

In order to manually effect shifting of shifter fork 29 and shifter collar 24 to selectively engage either clutch jaws 21 and 26 or jaws 22 and 27 a hand lever 8 is disposed at the outside of housing 28. Lever 8 is non-rotatably carried on one end of a rock shaft 39, the latter being pivotally mounted on housing 28 and positioned transversely of support shaft 37. A link member 40 is located within housing 28 and is splined on shaft 39 for movement therewith. Link member 40 is provided with a pair of arms 41 and 42 that are pivotally connected respectively with a pair of thrust transmitting links 44 and 45, the latter being pivotally connected respectively to projections 46 and 47 which are integral with the shifter fork. Arm 41 and link 44 and arm 42 and link 45 form a pair of toggle linkages for operatively displacing shifter fork 29 axially of support shaft 37. The toggle linkages and their operation are described in further detail in U.S. Patent 2,870,643.

As shown in Fig. 2, rock shaft 39 has been rotated by means of hand lever 8 in a counterclockwise direction displacing shifter fork 29 and shifter collar 24 in the leftward direction engaging jaws 26 of the latter with jaws 21 of spur gear 16 thereby rotationally locking gear 16 to driven shaft 11.

From Fig. 2, it will also be apparent that the toggle linkages in addition to the support shaft 37 and bearings 35 and 36 of sleeve portion 34 are located within gear box 6 well above the level of the oil bath, which is indicated generally by reference numeral 49. Oil bath 49 is maintained within the lower portion of housing 9 in the conventional manner.

*Lubrication system*

A lubrication system will now be described for raising the oil from oil bath 49 at the bottom of housing 9 and directing it to lubricate the shifter fork mounting and also the toggle linkages.

Referring to Figs. 2, 3 and 5, the bifurcated end of shifter fork 29 including tines 30 and 31 are complementary to and received in groove 32 of the shifter collar 24 with the sides 50 and 51 of the bifurcated end having a free running fit with the peripheral sidewalls 52 and 53 of groove 32. The end portions 55 and 56 of tines 30 and 31, however, have a close clearance with the peripheral inner wall 58 of groove 32. Portions 55 and 56 in effect form the ends of a pressure chamber 57 which is defined by the circumferential space between the inner surface 59 of the bifurcated end and the peripheral walls 52, 53 and 58 of groove 32.

At the edges of portion 56 adjacent to the peripheral walls of groove 32 are formed a pair of grooves 60 and 61 which serve as inlet ports for pressure chamber 57. Oil adhering to the peripheral walls 52, 53 and 58 of groove 32 during counterclockwise rotation of collar 24 in the oil bath 49 will be admitted into pressure chamber 57 through grooves 60 and 61. Considering peripheral walls 52, 53 and 58 of groove 32 from the general point of view it will be apparent that each of these walls present an oil collecting surface being adapted to rotate in oil bath 49. It will also be apparent that end portion 55 of tine 30 serves as a dam or oil collecting means for wiping the oil from the oil collecting surfaces of peripheral walls 52, 53 and 58 and damming or backing up the oil in the pressure chamber 57.

An outlet port 62 for pressure chamber 57 is provided in the bifurcated end of the shifter fork 29 and is connected by means of passageway 63 to a reservoir 64 formed by the annular space between support shaft 37 and the inner walls of sleeve portion 34 intermediate the sleeve bearings 35 and 36. Passageway 63 thereby serves to channel oil from pressure chamber 57 to reservoir 64 for lubricating the bearing surfaces between support shaft 37 and bearings 35 and 36.

Referring to Figs. 2 and 3, a second reservoir 66 is defined by means of a depression which is formed on the upper surface of the sleeve portion 34 of shifter fork 29. Reservoir 66 opens upwardly in order to accommodate the toggle linkages which are dipped into the oil which accumulates therein. Oil is supplied to reservoir 66 from reservoir 64 by means of an opening 67 in sleeve portion 34.

Referring to Fig. 4, the shifter fork 70 that is illustrated is similar to shifter fork 29 in every respect except that the sleeve portion 71 of fork 70 does not have an open reservoir formed on its top. Opening 67 formed in sleeve 71 serves as an overflow for reservoir 64. It will be noted that opening 67 and passageway 63 in both of forks 29 and 70 are coaxial and may be formed by a single drilling operation.

*Operation*

Referring to Fig. 2, it will readily be apparent that the shifter fork and collar have three positions: an intermediate position in which the tapered clutch jaws 26 and 27 of collar 24 are respectively out of engagement with the clutch jaws 21 and 22 of gears 16 and 17; a second position wherein the shifter fork 29 is moved leftward on shaft 37 simultaneously moving jaws 21 into engagement with jaws 26 and thereby drivingly connecting gear 16 with shaft 11 (as shown in Fig. 2); and a third position wherein the shifter fork 29 is moved axially to the right on shaft 37 simultaneously shifting jaws 27 into engagement with jaws 22 to drivingly connect gear 17 with shaft 11. The lubrication system disclosed herein is operative only when shaft 11 is rotated in a counterclockwise direction (as shown in Fig. 2) which will occur during driving engagement of gear 16 with shaft 11. During counterclockwise rotation of the collar 24 in oil bath 49 oil adhering to the peripheral walls 52, 53 and 58 of groove 32 is carried into pressure chamber 57 through inlet ports 60 and 61. Portion 55 serves as a dam or oil collecting means for wiping off oil adhering to the peripheral walls of groove 32 and backing up the oil in the pressure chamber 57. Continuous rotation of collar 24 will build up a pressure in chamber 57 and oil will be pumped through port 62 and passageway 63 to reservoir 64 to lubricate the bearing surfaces between sleeve bearings 35 and 36 and support shaft 37. When reservoir 64 becomes full, oil is forced up through opening 67 into the open reservoir 66 into which the toggle linkages may be dipped (as shown in Fig. 2) during shifting. Oil overflowing from open reservoir 66 will spill back into the oil bath 49 within housing 9.

Referring to Fig. 4, once reservoir 64 of fork 70 becomes filled, oil will pass through opening 67 and spill directly back to the oil bath 49 within housing 9.

The coaction between the bifurcated end of shifter fork 29 and groove 32 of collar 24 will, of course, be recognized as that of a viscosity pump. It will also be readily apparent to those skilled in the art that oil being pressurized by means of this viscosity pump action of the shifter fork and shifter collar may be channeled to any part of a power transmission mechanism for lubrication purposes.

From the foregoing detailed description it will be apparent that a novel lubrication system has been illustrated whereby a source of oil pressure is automatically provided by a viscosity pump action between the shifter fork and the shifter collar. This source of pressure has then been utilized for raising lubricating oil from an oil bath to lubricate relatively movable parts of the power transmission mechanism.

Although the present invention discloses two embodiments for shifter fork asemblies, both having a hole or passageway formed within the fork body for channeling oil out of the pressure chamber, it is not intended to limit any patent granted hereon to the particular details of this construction because other means may occur to those skilled in the art for porting, piping or otherwise directing oil from a pressure chamber for the purpose of lubricating the various parts of a power transmission mechanism.

Having now particularly described and ascertained the nature of my said invention and the manner in which it is to be performed, I declare that what I claim is:

1. A shifter assembly comprising: a collar having an annular groove, means for rotationally and axially shiftably mounting said collar on a support; a shifter fork means for axially shifting said collar, said shifter fork means having a bifurcated end complementary to and received in said annular groove; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of said bifurcated end having contact with the peripheral walls of said groove such that oil adhering to said oil collecting surface is wiped off and collected in said pressure chamber, and fluid passage means for distributing oil from said pressure chamber, rotation of said collar being effective to build up pressure in said pressure chamber and force oil through said passage means.

2. A shifter assembly comprising: a collar having an annular groove, means for rotationally and axially shiftably mounting said collar on a support; a shifter fork means for axially shifting said collar, said shifter fork means having a bifurcated end complementary to and received in said annular groove; means including relatively movable cooperating bearing surfaces for mounting said shifter fork means on said support; and a lubrication system for said bearing surfaces including a pressure chamber formed by the circumferential space between the inner surface of said bifurcated end and the peripheral walls of said groove, an oil collecting surface presented by one of the walls of said groove, said collecting surface being adapted to run in an oil bath, a portion of said bifurcated end having contact with the peripheral walls of said groove such that oil adhering to said oil collecting surface is wiped off and collected in said pressure chamber, and fluid passage means for connecting said pressure chamber in fluid communication with said bearing surfaces, rotation of said collar being effective to build up pressure in said pressure chamber and force oil through said passage means for lubricating said bearing surfaces.

3. A shifter assembly comprising: a collar having an annular groove, means for rotationally and axially shiftably mounting said collar on a support; a shifter fork means for axially shifting said collar, said shifter fork means having a bifurcated end complementary to and received in said annular groove; means for mounting said shifter fork means on said support including relatively movable cooperating bearing surfaces; and a lubrication system for said bearing surfaces including a pressure chamber formed by the circumferential space between the inner surface of said bifurcated end and the peripheral walls of said groove, an oil collecting surface presented by one of the walls of said groove, said collecting surface being adapted to run in an oil bath, a portion on each bifurcation of the bifurcated end having a close fit with the peripheral walls of said groove and forming the opposite ends of said pressure chamber, one of said portions having a groove adjacent to said oil collecting surface for admitting oil into said pressure chamber during rotation of said collar in one direction, the other of said portions serving as a dam for backing up the oil entering said pressure chamber on said oil collecting surface, and fluid passage means for connecting said pressure chamber in fluid communication with said bearing surfaces, rotation of said collar in said one direction being effective to build up pressure in said pressure chamber and force oil through said passage means for lubricating said bearing surfaces.

4. A shifter assembly comprising: a collar having an annular groove, means for rotationally and axially shiftably mounting said collar on a support; a shifter fork means for axially shifting said collar, said shifter fork means having a bifurcated end complementary to and received in said annular groove; means for mounting said shifter fork means on said support; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of said bifurcated end having a contact with the peripheral walls of said groove at one end of said pressure chamber such that oil adhering to said oil collecting surface is dammed up in said pressure chamber, an outlet port for said pressure chamber and fluid passage means connected to said outlet port, rotation of said collar being effective to build up pressure in said pressure chamber and force oil through said passage means.

5. A shifter assembly comprising: a collar having an annular groove, means for rotationally and axially shiftably mounting said collar on a support; a shaft anchored on said support; a shifter fork means axially slidably mounted on said shaft, said shifter fork means having a bifurcated end complementary to and received in the annular groove of said collar for shifting the latter; and a lubrication system for said shifter fork means including a pressure chamber formed by the circumferential space between the inner surface of said bifurcated end and the peripheral walls of said groove, an oil collecting surface presented by one of the walls of said groove, said oil collecting surface being adapted to run in an oil bath, a portion of each bifurcation of the bifurcated end having a close fit with the peripheral walls of said groove and forming the opposite ends of said pressure chamber, one of said portions having an aperture whereby oil adhering to said oil collecting surface may be admitted to said pressure chamber, the other of said portions serving as a dam for backing up the oil entering said pressure chamber on said oil collecting surface, a reservoir formed by an annular space between said shaft and said shifter fork, and fluid passage means for interconnecting said pressure chamber in fluid communication with said reservoir, rotation of said collar being effective to build up pressure in said pressure chamber and force oil through said passage means to said reservoir.

6. A shifter assembly for power transmissions and the like comprising: a collar having an annular groove, means for rotationally and axially shiftably mounting said collar on a support; a shifter fork means for axially shifting said collar, said shifter fork means having a bifurcated end complementary to and received in said annular groove; means for mounting said shifter fork means on said support including complementary relatively movable bearing surfaces; and a lubrication system including a pressure chamber defined by the circumferential space between the inner surface of said bifurcated end and the peripheral walls of said groove, an oil collecting surface presented by one of the walls of said groove, said oil collecting surface being adapted to run in an oil bath, a portion of said bifurcated end having a close fit with the peripheral walls of said groove at one end of said pressure chamber such that oil adhering to said oil collecting surface is dammed up in said pressure chamber, a reservoir formed in said shifter fork means to retain lubricating oil for said bearing surfaces, fluid passage means formed within said shifter fork means for connecting said reservoir in fluid communication with said pressure chamber, rotation of said collar being effective to build up pressure in said pressure chamber and force oil to said reservoir, and overflow means for said reservoir whereby excess oil may be exhausted.

7. A shifter assembly comprising: a collar having an annular groove, means for rotationally and axially shiftably mounting said collar on a support; a shifter fork means for axially shifting said collar, said shifter fork means having a bifurcated end complementary to and received in said annular groove; means for mounting said shifter fork means on said support; a manually controlled linkage means operatively connected in thrust transmitting relationship with said shifter fork means for selectively shifting the latter; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of said bifurcated end forming one end of said pressure chamber, said portion having contact with the peripheral walls of said groove such that oil adhering to said oil collecting surface is dammed up in said pressure chamber, an open reservoir formed on the surface of said shifter fork means adjacent said linkage means and into which the latter may be dipped during shifting, and means for connecting said open reservoir in fluid communication with said pressure chamber, rotation of said collar being effective to build up pressure in said pressure chamber and force oil to said open reservoir.

8. A shifter assembly comprising: a collar having an annular groove, means for rotationally and axially shiftably mounting said collar on a support; a support shaft mounted on said support; a shifter fork means axially slidably mounted on said shaft, said shifter fork means having a bifurcated end complementary to and received in the annular groove of said collar for shifting the latter; a linkage means mounted on said support and connected in thrust transmitting relationship with said shifter fork means for selectively controlling the axial movement of the latter; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of each bifurcation of the bifurcated end having contact with the peripheral walls of said groove such that said portions respectively form the opposite ends of said pressure chamber, one of said portions having an aperture whereby oil adhering to said oil collecting surface may be admitted to said pressure chamber, the other of said portions serving as a dam for backing up the oil entering said pressure chamber on said oil collecting surface, a reservoir formed in the annular space between said support shaft and said shifter fork means, and fluid passage means for interconnecting said pressure chamber in fluid communication with said reservoir, an open reservoir formed on the exterior of said shifter fork means adjacent said linkage means into which the latter may be dipped, means for interconnecting said reservoir in fluid communication with each other, rotation of said collar being effective to build up pressure in said pressure chamber and force oil through said passage means to said reservoirs.

9. A shifter assembly comprising: a collar having an annular groove, means for rotationally and axially shiftably mounting said collar on a support; a shaft mounted on said support; a shifter fork means axially slidably mounted on said shaft, said shifter fork means having a bifurcated end complementary to and received in the annular groove of said collar for shifting the latter; a manually actuated toggle linkage operatively interposed in thrust transmitting relationship between said support and said shifter fork means for controlling the axial movement of the latter; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of each bifurcation of the bifurcated end having contact with the peripheral walls of said groove such that said portions respectively form the opposite ends of said pressure chamber, one of said portions having an aperture whereby oil adhering to said collecting surface may be admitted to said pressure chamber, the other of said portions serving as a dam for backing up the oil entering said pressure chamber on said oil collecting surface, an open reservoir formed on the exterior of said shifter fork means adjacent said toggle linkage into which the latter may be dipped during shifting of said shifter fork means, means for interconnecting said reservoir in fluid communication with said pressure chamber, rotation of said collar being effective to build up pressure in said pressure chamber and force oil through said passage means to said open reservoir.

10. A shifter assembly comprising: a collar having an annular groove, means for rotationally and axially shiftably mounting said collar on a support; a shaft adapted to be anchored on said support; a shifter fork means having a sleeve portion being axially slidably mounted on said shaft, said shifter fork means also having a bifurcated end complementary to and received in the annular groove of said collar for shifting the latter; and a lubrication system including a pressure chamber formed by the circumferential space between the inner surface of said bifurcated end and the peripheral walls of said groove, an oil collecting surface presented by one of the walls of said groove, said collecting surface being adapted to run in an oil bath, a portion of each bifurcation of the bifurcated end having contact with the peripheral walls of said groove such that said portions respectively form the opposite ends of said pressure chamber, one of said portions having a groove adjacent to said oil collecting surface whereby oil adhering to the latter may be admitted to said pressure chamber, the other of said portions serving as a dam for backing up the oil entering said pressure chamber on said oil collecting surface, a reservoir defined by the annular space between the inner surface of said sleeve and the exterior of said shaft, fluid passage means formed in said shifter fork means interconnecting said reservoir in fluid communication with said pressure chamber, rotation of said collar being effective to build up pressure in said pressure chamber and force oil through said passage means to said reservoir, and an opening in said sleeve communicating with said reservoir through which oil may be exhausted.

11. A shifter assembly comprising: a collar having an annular groove, means for rotationally and axially shiftably mounting said collar on a support; a support shaft mounted on said support; a shifter fork means having a bifurcated end complementary to and received in the annular groove of said collar for shifting the latter, said shifter fork means having a sleeve portion; a pair of spaced bearing means carried within said sleeve portion for axially slidably supporting said shifter fork means on said support shaft; a toggle linkage interposed in thrust transmitting relationship between said support and said shifter fork means for selectively controlling the axial movement of the latter; and a lubrication system for said shifter fork means including a pressure chamber formed by the circumferential space between the inner surface of said bifurcated end and the peripheral walls of said groove, an oil collecting surface presented by one of the walls of said groove, said collecting surface being adapted to run in an oil bath, a portion of each bifurcation of the bifurcated end having contact with the peripheral walls of said groove such that said portions respectively form the opposite ends of said pressure chamber, one of said portions having a groove adjacent to said oil collecting surface whereby oil adhering to the latter may be admitted to said pressure chamber, the other of said portions serving as a dam for backing up the oil entering said pressure chamber on said oil collecting surface, a first reservoir defined by the annular space between the periphery of said support shaft and the inner surface of said sleeve portion and being closed at opposite axial ends by said bearing means, a passageway formed in said shifter fork means for interconnecting said pressure chamber in fluid communication with said first reservoir, an open reservoir formed on the exterior of said sleeve portion adjacent said toggle linkage into which the latter is dipped during shifting of said shifter fork means, an opening formed in said sleeve for interconnecting said reservoirs in fluid communication with each other, rotation of said collar being effective to build up pressure in said pressure chamber and force oil through said passageway to said first reservoir and thence through said opening to said open reservoir.

12. In a motor grader power control box comprising: a driven shaft; a pair of gears rotatable thereon; a collar slidable on and rotatable with said driven shaft to effect a driving connection with one or the other of said gears; an annular groove on said collar, a shifting fork means having a bifurcated end complementary to and received in said groove for sliding said collar; and means including relatively slidable bearing surfaces for mounting said shifter fork means on said control box; a lubrication system including a pressure chamber defined by the annular space between said groove and said bifurcated end, an oil collecting surface presented by an annular surface of said groove, said collecting surface being adapted to run in oil, dam means on said bifurcated end having a close fit with said groove for backing up oil entering said pressure chamber on said oil collecting surface, and a passageway formed within said shifter fork for channeling oil from said pressure chamber to said bearing surfaces, rotation of said collar being effective to build up oil pressure in said pressure chamber and force oil through said passage means to lubricate said bearings.

13. In a motor grader power control box comprising: a driven shaft; a pair of gears rotatable thereon; a collar slidable on and rotatable with said driven shaft to effect a driving connection with one or the other of said gears; an annular groove on said collar, a shifting fork for sliding said collar; means including relatively movable bearing surfaces for mounting said shifter fork on said control box; and a connection between the collar and shifting fork including a yoke means complementary to and received in said groove; a viscosity pump means including a pressure chamber formed between said yoke means and said groove; and a fluid passage means connecting said pressure chamber with said bearing surfaces, rotation of said collar being effective to build up oil pressure and force oil through said passage means to lubricate said bearing surfaces.

14. A shifter assembly for a power transmission and the like comprising: a collar being slidably mounted on and rotatable with a driven shaft; an annular groove on said collar being adapted to run in oil; a shifting fork means for sliding said collar; and a connection between the collar and shifting fork means including a yoke means complementary to and received in said groove; a lubrication system including a viscosity pump means formed at said connection between the yoke means and the groove, and a fluid outlet passage means connected with said pump means, rotation of said collar being effective to build up oil pressure and force oil through said outlet passage means.

References Cited in the file of this patent

UNITED STATES PATENTS 1,116,171    Trumble  ---------------- Nov. 3, 1914